United States Patent [19]

Hembling et al.

[11] Patent Number: 5,389,393
[45] Date of Patent: Feb. 14, 1995

[54] QUICK-SETTING DESSERT GEL MIX

[75] Inventors: Mark V. Hembling, New Fairfield, Conn.; Lawrence T. McCarty, Ossining; Julia A. Stephenson, Cold Spring, both of N.Y.; Eva C. Szewczyk, Jersey City, N.J.; Charles W. Bertalan, New Brunswick, N.J.; Joseph P. DeStephano, Mahwah; N.J.

[73] Assignee: Kraft General Foods, Inc., Northfield, Ill.

[21] Appl. No.: 44,342

[22] Filed: Apr. 7, 1993

[51] Int. Cl.[6] .......................................... A23L 1/05321
[52] U.S. Cl. ...................................... 426/575; 426/541
[58] Field of Search ............................... 426/573–577, 426/541

[56] References Cited

U.S. PATENT DOCUMENTS

| 2,000,807 | 5/1935 | Wig | 426/575 |
|---|---|---|---|
| 2,559,338 | 7/1951 | Barch | 426/577 |
| 2,673,757 | 3/1954 | Shepherd et al. | 426/577 |
| 2,701,767 | 2/1955 | Twieg et al. | 426/97 |
| 2,809,894 | 10/1957 | Poarch et al. | 426/576 |
| 2,930,701 | 3/1960 | Merton | 426/575 |
| 2,935,409 | 5/1960 | McDowell et al. | 426/575 |
| 3,455,701 | 7/1969 | Miller | 426/575 |
| 3,770,462 | 11/1973 | Schuppner | 426/186 |
| 3,850,838 | 11/1974 | Guchenberger et al. | 426/575 |
| 4,268,533 | 5/1981 | Williams et al. | 426/577 |
| 4,693,728 | 8/1987 | Clare et al. | 8/561 |

FOREIGN PATENT DOCUMENTS

| 552744 | 12/1956 | Belgium . |
| 910705 | of 1972 | Canada . |
| 0437360 | 7/1991 | European Pat. Off. . |
| 0517423 | 12/1992 | European Pat. Off. . |
| 1217635 | 11/1956 | France . |
| 1198852 | 12/1959 | France . |
| 2268476 | 11/1975 | France . |
| 1114695 | 10/1961 | Germany . |
| 1642545 | 3/1972 | Germany . |

OTHER PUBLICATIONS

Food Hydrocolloids, vol. II, Glicksman, CRC Press 1983, pp. 165–166.

Primary Examiner—Jeanette Hunter
Attorney, Agent, or Firm—Thomas R. Savoie; Thomas A. Marcoux

[57] ABSTRACT

A dry mix for producing a quick-setting gel which has a texture which is as desirable as gelatin gels. The mix contains as components agglomerated potassium or sodium alginate, agglomerated calcium salt, sweetening agents, food acids, buffering agents and preferably antioxidant. The sweetening agents can be sugars, intensive sweeteners and/or hydrolyzed starches.

26 Claims, No Drawings

QUICK-SETTING DESSERT GEL MIX

FIELD OF INVENTION

This invention relates to a gel-forming composition and more particularly to a one-package, gel-forming, dry-mix composition which rapidly form a gel having a texture which is equally as preferred as conventional gelatin dessert gels.

DESCRIPTION OF PRIOR ART

Gelatin dessert gels are well-known and highly regarded by consumers. However, as crystalline gelatin is not soluble in cold water, recipes for making gelatin gels call for dissolution of the gelatin in boiling water. The gelatin solution must then be cooled to below about 70° F. (21.1° C.) in order to effect gelation. Typically about a two-hour period is necessary in order to produce gelatin desserts. There has long been a desire to provide a gelatin dessert in quick-gel form. Such a product would not have to be prepared hours in advance of consumption, but could be made ready for consumption within minutes. The prior art has disclosed methods for producing cold-water soluble gelatin; however, the length of time needed to set the gel is still in the one to two hour range.

Pectin has been the basis of many attempts to provide cold water-soluble, quick-set dessert gels. Low-methoxyl (LM) pectins have the property of quickly forming gels in water solution upon the addition of a calcium salt or salts of other metals of the alkaline earth series. However, if a mixture of LM pectin and soluble calcium salt is added directly to cold water, gelation will be initiated before the LM pectin has fully dissolved. Such partial or premature gelling prevents further dissolution of the pectin material and results in a mushy or soupy mass as an end product.

Attempts have been made to overcome the problem of too rapid setting of LM pectin gels by means of a two-package system wherein the pectin would first be fully dissolved before addition of calcium salt. Such efforts have not been commercially successful because of the inconveniences involved in the use of separated reactants and/or inferior textures. Other attempts have sought to physically retard the solution of the calcium salt such as by coating the salt with a vegetable or artificial gum or by the use of heat-treated anhydrous mono-calcium phosphate. Methods for increasing the solubility of LM pectin in cold water to approach that of the calcium salt, such as by co-drying the pectin with sugars, have also been attempted. These and other efforts at producing one-package, quick-set gels based on LM-pectin are described in U.S. Pat. Nos. 2,559,338 to Barch, 2,673,757 to Shepard et al., 2,701,767 to Twieg et al. 2,809,894 to Poarch et al., and 4,268,533 to Williams et al. None of these techniques have, however, been able to offer a one-package, quick-set gel which has a texture as desirable as the highly-regarded and accepted texture of gelatin gels.

Attempts have also been made at producing dessert gels from carrageenans (e.g., kappa-carrageenan) that gel at room temperature in the presence of potassium ions; however, the resulting gel texture is quite inferior to that of gelatin gels. Sodium alginate has also been suggested for use in forming dessert gels.

SUMMARY OF THE INVENTION

The present invention describes a dry mix for producing a quick-set alginate gel which has a texture as desirable in mouthfeel to gelatin gels. The mix is comprised of agglomerates of sodium or potassium alginate powder (100% through No. 230 U.S. mesh sieve, with a mean particle diameter of 10 to 60 microns), agglomerates of slowly soluble calcium salts (e.g., calcium citrate, carbonate, phosphate, sulfate and/or tartrate), food acid, buffering agent and sweetening agent. The sweetening agent including sugars, water-soluble hydrolyzed starch solids and/or intensive sweeteners such as aspartame, asulfame-K, sucralose, saccharine, dihydrochalcone, cyclamate and the like.

As used herein all percentages are by weight unless specifically stated otherwise.

DETAILED DESCRIPTION OF THE INVENTION

Sodium or potassium alginate is ground and sieved as needed to obtain a fraction which is 100% minus 200 U.S. mesh, preferably 100% minus 230 U.S. mesh and having an average mean particle sizes diameter of from 10 to 60 microns, preferably about 30 microns. It has been found that these small-sized particles aid in producing a smooth texture in the prepared dessert gel. This alginate powder is then agglomerated to ensure dispersibility of the fine alginate particles which, in the absence of agglomeration, would clump on contact with water. Agglomeration will be effected using an aqueous agglomerating fluid which may be water or water with a minor (e.g., up to 20%, preferably up to 10%) amount of an agglomerating aid, such as triacatin, or other surface active dispersing aids.

Agglomeration of the alginate powder may be effected utilizing standard equipment and methodology such as by batch or continuous fluid bed agglomeration or continuous co-current or countercurrent tower agglomeration. The alginate agglomerates are sieved to scalp off over-sized clusters which would be slow to dissolve to obtain a fraction with 100% being minus 16 U.S. mesh, preferably 100% minus 20 U.S. mesh and with no more than 50% passing through a 170 U.S. mesh sieve, preferably with no more than 50% passing through a 140 U.S. mesh sieve. Undersized particles out of the agglomerator may be recycled and oversized particles may be ground to proper size. The alginate powder may be co-agglomerated with another of the gel mix ingredients, such as sugar and/or dextrin, but this typically will not be done as there is not a need to incur this increased processing cost.

The slowly water-soluble calcium salt, such as calcium sulfate is also agglomerated either per se or with up to 90% of a water-soluble, carbohydrate filler such as maltodextrin and/or sugars. Calcium salt agglomeration can be facilitated by utilizing aqueous agglomerating fluids as described above or utilizing straight water with no surfactant and can be effected by means of conventional agglomeration techniques also as described above. Agglomeration of the calcium salt is desired in order to slow dissolution of calcium during preparation of the dessert so that most of the alginate is dispersed and dissolved prior to significant build-up of calcium ion concentration. To protect against the effects of hard water which is present in many households and which may contain up to and in excess of 400 p.p.m. total hardness (i.e., a combination of dissolved calcium and magnesium), the dessert gel mix of this invention will contain a buffering agent which includes a monovalent cation, such as trisodium citrate. Other suitable buffers would be sodium and potassium phosphates, sodium and potassium acetates, tartrates, malates, fumarates, adipates and ascorbates and potassium citrate.

The dessert gel mix of the present invention will also contain sweetening agents, food acids, flavors and colors. Preferably a anti-oxidant, such as ascorbic acid, erythorbic acid or tocopherols, such as vitamin E, is also included to further increase clarity of the prepared dessert gel.

It will also be desirable to maintain the level of soluble solids in the dessert gel to at a relatively low level in order to increase clarity of the prepared dessert gel. This feature is due to the finding that as the solids level increases in the dessert gel more air is forced of solution and this undissolved air detracts from the clarity of the gel. Obviously this problem is most apparent in full sugar versions (i.e., no intensive sweetener present) of the dessert mix. Sugar solids can however be reduced by substituting fructose for a portion of the sucrose. Sucrose will normally be utilized to provide at least a portion of the sweetness in any sugar-containing gel mix of this invention. To aid in the dispersibility of the mix a portion (e.g., 5 to 60%) of the sucrose may be in powdered form with the remainder being granulated.

The acid component is employed to give the desirable sour taste and pH of conventional fruit-flavored dessert gels. Acids such as citric, adipic, fumaric, malic and/or tartaric may be employed. The amount of acid employed is sufficient to give a final pH in the prepared dessert gel of between 3.5 and 5.5, preferably between about 4.2 and 4.8.

The following formulations represent the dry mix compositions of this invention and are set forth in three variants of full-sugar, reduced-sugar and sugar-free, each with a broad range and a preferred range.

dissolve the mix in water. An electric mixer is not needed. Stirring for less than two minutes, typically less than one minute, will suffice to achieve complete dissolution. An alginate will set within 20 minutes either in or out of a refrigerator. Usually, however, the ungelled mixture is placed in a refrigerator to set so that it will be chilled prior to being served. The resulting gel has a texture which is as desirable as gelatin gels.

This invention is further described but not limited by the following examples.

EXAMPLE 1

A full-sugar, quick-setting, dessert gel mix was prepared. Potassium alginate was ground and sieved to obtain a fraction of 100% minus 230 U.S. mesh and having a target mean particle diameter of 30 microns. This alginate fraction was agglomerated using a solution of 2.5% triacetin in distilled water. The solution was employed at a level of 1.5 parts triacetin per 100 parts potassium alginate. Agglomeration was conducted in a batch-type, fluid-bed agglomerator, with drying of the agglomerate taking place in the agglomerator. Calcium sulfate was combined with an equal weight of 10DE maltodextrin and the mixture was agglomerated as above, but using only distilled water. Agglomerates larger than 14 U.S. mesh were removed for regrinding. The dry mix was prepared in a ribbon blender by combining the following ingredients:

| Ingredient | Parts By Weight |
|---|---|
| Granulated Sucrose | 49.7 |
| Crystalline Fructose | 32.8 |
| Powdered Sucrose | 5.0 |
| Agglomerated Potassium Alginate | 3.7 |
| Adipic Acid | 2.8 |
| Ascorbic Acid | 0.6 |
| Trisodium Citrate, Dihydrate | 2.8 |
| Agglomerated Calcium Sulfate/Maltodextrin | 1.0 |
| Flavor/Color | 0.4 |

| Ingredient | Full Sugar Broad (%) | Full Sugar Preferred (%) | Reduced Sugar Broad (%) | Reduced Sugar Preferred (%) | Sugar Free Broad (%) | Sugar Free Preferred (%) |
|---|---|---|---|---|---|---|
| Sucrose | 30–95 | 40–70 | 30–80 | 60–75 | — | — |
| Fructose | 0–50 | 25–45 | 0–40 | 10–30 | — | — |
| Intensive Sweeteners | — | — | .01–1 | .1–.5 | .2–4 | .5–3 |
| Carbohydrate Bulking Agent (e.g., malto-dextrin) | — | — | — | — | 35–80 | 60–75 |
| Agglomerated Potassium Alginate | 2–5 | 2.8–4.0 | 3.5–15 | 4–8 | 5–20 | 7–15 |
| Agglomerated Calcium Salt (w/o fillers) | 0.2–1.2 | 0.4–0.8 | .5–3 | .7–1.5 | .6–4 | 1–3 |
| Food Acid | 1.5–6 | 2.5–4.5 | 3–12 | 4–10 | 5–15 | 6–12 |
| Buffer Agent | 1.5–6 | 2–4 | 3–12 | 4–8 | 4–15 | 6–12 |
| Anti-Oxidant | 0–1.5 | 0.3–0.8 | 0–1.5 | 0.3–1.2 | 0–2.5 | 0.8–1.6 |
| Flavor/Color | as needed | as needed | as needed | as needed | as needed | as needed |

The dry dessert mixes of this invention are able to produce a dessert gel within about 20 minutes or less. Formulas which can produce gels within as little as five minutes are possible. Preparation is a simple matter of combining the dry mix with water. Cold tap water is preferred as colder water will retard dissolution of the calcium salt resulting in gels of improved texture. However, water temperature can range from 32° to 80° F. (0° to 26.7° C.). A spoon, fork or wire whisk can be used to 98.8 grams of this mix was added to 2 cups (474 ml) of cold tap water, stirred with a spoon for about 50 seconds, poured in four 4-ounce cups and refrigerated for 15 to 20 minutes. The resulting gel was judged by a sample of 470 consumers as being equally preferred to like flavored commercial gelatin dessert gels.

EXAMPLE 2

A reduced-sugar, quick-setting, powdered dessert gel mix was prepared as in Example 1 by combining the following ingredients:

| Ingredient | Parts By Weight |
| --- | --- |
| Granulated Sucrose | 35.0 |
| Powdered Sucrose | 5.0 |
| Agglomerated Potassium Alginate (per Example 1) | 3.6 |
| Adipic Acid | 3.0 |
| Tri-Sodium Citrate, Dihydrate | 2.8 |
| Agglomerated Calcium Sulfate/Maltodextrin (per Example 1) | 0.9 |
| Ascorbic Acid | 0.25 |
| Aspartame | 0.14 |
| Ascesulfame-K | 0.05 |
| Flavor/Color | 0.4 |

51.14 grams of the mix was prepared as a gelled dessert as in Example 1. The resulting gel was judged by a ten-member taste panel as being close to that of Example 1 in terms of taste/texture and in addition was judged as being somewhat clearer.

EXAMPLE 3

A sugar-free, quick-setting, powdered dessert gel mix was prepared as in Example 1 by combining the following ingredients:

| Ingredient | Parts By Weight |
| --- | --- |
| 10DE Maltodextrin | 24.0 |
| Agglomerated Potassium Alginate (per Example 1) | 3.5 |
| Adipic Acid | 3.0 |
| Tri-Sodium Citrate, Dehydrate | 2.8 |
| Agglomerated Calcium Sulfate/Maltodextrin (per Example 1) | 0.9 |
| Ascorbic Acid | 0.15 |
| Aspartame | 0.28 |
| Ascesulfame-K | 0.09 |
| Flavor/Color | 0.4 |

35.12 grams of this mix was prepared as a gelled dessert as in Example 1. The resulting gel was judged by a ten-member taste panel as being close to Example 1 in terms of taste/texture and was also noted as being very clear.

Having thus described the invention what is claimed is:

1. A dry mix for producing a quick-setting, sugar-sweetened, clear-edible gel having a pH of between 3.5 and 5.5, said mix being fully dispersible in cold tap water with spoon stirring for less than one minute and said mix comprising on a weight basis:
   (a) 80 to 95% sugars;
   (b) 2 to 5% agglomerated potassium or sodium alginate, said agglomerates being 100% minus 16 U.S. mesh sieve, with no more than 50% passing through a 170 U.S. mesh sieve, said agglomerates being formed from particles of potassium or sodium alginate having a mean particle diameter of 10 to 60 microns and said agglomerate being free of sugars and dextrins;
   (c) 1 to 6% food acid;
   (d) 1 to 6% buffering agent;
   (e) 0.25 to 1.0 of agglomerated slowly soluble calcium salt; and
   (f) an anti-oxidant in an amount that will increase the clarity of the gel.

2. The dry mix of claim 1 wherein the calcium salt is co-agglomerated with a water-soluble carbohydrate bulking agent at a weight ratio of 1:0.5–2.

3. The dry mix of claim 2 wherein the bulking agent is a maltodextrin.

4. The dry mix of claim 2 wherein the calcium salt is calcium sulfate, calcium phosphate or calcium citrate.

5. The dry mix of claim 1 wherein the alginate agglomerates are 100% minus 20 U.S. mesh with no more than 50% passing through a 140 U.S. mesh sieve.

6. The dry mix of claim 1 wherein the sugars consist of a sucrose and fructose at a weight ratio of 1:0.3–1.0.

7. The dry mix of claim 1 wherein the mix contains an anti-oxidant selected from the group consisting of ascorbic acid, erythorbic acid, tocopherol and combinations thereof.

8. The dry mix of claim 1 wherein the mix contains from 0.3 to 0.8% anti-oxidant.

9. A dry mix for producing a quick-setting, reduced-sugar edible gel having a pH of between 3.5 and 5.5, said mix being fully dispersible in cold tap water with spoon stirring for less than one minute and said mix comprising on a weight basis:
   (a) 60 to 80% sugars;
   (b) 4 to 10% agglomerated potassium or sodium alginate, said agglomerates being 100% minus 16 U.S. mesh sieve, with no more than 50% passing through a 170 U.S. mesh sieve and said agglomerates being formed from particles of potassium or sodium alginate having a mean particle diameter of 10 to 60 microns and said agglomerate being free of sugars and dextrins;
   (c) 3 to 12% food acid;
   (d) 2 to 12% buffering agent;
   (e) 0.5 to 2.0% of agglomerated slowly soluble calcium salt;
   (f) 0.05 to 2% intensive sweetener; and
   (g) an anti-oxidant in an amount that will increase the clarity of the gel.

10. The dry mix of claim 9 wherein the calcium salt is co-agglomerated with a water-soluble carbohydrate bulking agent at a weight ratio of 1:0.5–2.

11. The dry mix of claim 10 wherein the bulking agent is a maltodextrin.

12. The dry mix of claim 10 wherein the calcium salt is calcium sulfate, calcium phosphate or calcium citrate.

13. The dry mix of claim 9 wherein the potassium alginate agglomerates are 100% minus 20 U.S. mesh with no more than 50% passing through a 140 U.S. mesh sieve.

14. The dry mix of claim 9 wherein the sugars consist of a sucrose and fructose at a weight ratio of 1:03–1.0.

15. The dry mix of claim 9 wherein the intensive sweetener is selected from the group consisting of aspartame, asulfame-K, sucralose, saccharine, dehydrochalcone, cyclamate and mixtures thereof.

16. The dry mix of claim 9 wherein the mix contains an anti-oxidant selected from the group consisting of ascorbic acid, erythorbic acid, tocopherol and combinations thereof.

17. The dry mix of claim 9 wherein the mix contains from 0.3 to 0.8% anti-oxidant.

18. A dry mix for producing a quick-setting, sugar-free edible gel having a pH of between 3.5 and 5.5, said mix being fully dispersible in cold tap water with spoon stirring for less than one minute and said mix comprising on a weight basis:
  (a) 40–75% water-soluble carbohydrate bulking agent;
  (b) 6–18% agglomerated potassium or sodium alginate, said agglomerates being 100% minus 16 U.S. mesh sieve, with no more than 50% passing through a 170 U.S. mesh sieve, and said agglomerates being formed from particles of potassium or sodium alginate having a mean particle diameter of 10 to 60 microns and said agglomerate being free of sugars and dextrins;
  (c) 6 to 18% food acid;
  (d) 4 to 14% buffering agent;
  (e) 1.2 to 5.0% of agglomerated slowly soluble calcium salt;
  (f) 0.1 to 4% intensive sweetener; and
  (g) an anti-oxidant in an amount that will increase the clarity of the gel.

19. The dry mix of claim 18 wherein the calcium salt is co-agglomerated with a water-soluble carbohydrate bulking agent at a weight ratio of 1:0.5–2.

20. The dry mix of claim 19 wherein the bulking agents are maltodextrins.

21. The dry mix of claim 20 wherein the maltodextrins has a D.E. of from 0.5 to 15.

22. The dry mix of claim 19 wherein the calcium salt is calcium sulfate, calcium phosphate or calcium citrate.

23. The dry mix of claim 18 wherein the potassium alginate agglomerates are 100% minus 20 U.S. mesh with no more than 50% passing through a 140 U.S. mesh sieve.

24. The dry mix of claim 18 wherein the intensive sweetener is selected from the group consisting of aspartame, asulfame-K, sucralose, saccharine, dihydrochalcone, cyclamate and mixtures thereof.

25. The dry mix of claim 18 wherein the mix contains an anti-oxidant selected from the group consisting of ascorbic acid, erythorbic acid, tocopherol and combinations thereof.

26. The dry mix of claim 18 wherein the mix contains from 0.3 to 0.8% anti-oxidant.

* * * * *